US008662455B2

(12) United States Patent
Hernandez et al.

(10) Patent No.: US 8,662,455 B2
(45) Date of Patent: Mar. 4, 2014

(54) SPRING CLIP RETENTION SYSTEMS SUITABLE FOR USAGE WITHIN VEHICLES AND GUIDED MUNITIONS

(75) Inventors: Christopher L. Hernandez, Vail, AZ (US); Ryan A. Egbert, Tucson, AZ (US)

(73) Assignee: Raytheon Company, Waltham, MA (US)

(*) Notice: Subject to any disclaimer, the term of this patent is extended or adjusted under 35 U.S.C. 154(b) by 168 days.

(21) Appl. No.: 13/183,062

(22) Filed: Jul. 14, 2011

(65) Prior Publication Data

US 2013/0015288 A1    Jan. 17, 2013

(51) Int. Cl.
*F16L 3/00*    (2006.01)

(52) U.S. Cl.
USPC ............ 248/73; 248/222.12; 248/230.7; 248/316.1

(58) Field of Classification Search
USPC ......... 248/65, 74.1, 74.2, 74.4, 67.7, 61, 62, 248/72, 73, 221.4, 222.12, 230.7, 316.1
See application file for complete search history.

(56) References Cited

U.S. PATENT DOCUMENTS

| 1,837,259 | A | * | 12/1931 | Fitzpatrick | 248/74.4 |
|---|---|---|---|---|---|
| 2,068,932 | A | * | 1/1937 | Quarnstrom | 248/73 |
| 2,375,513 | A | * | 5/1945 | Bach | 248/59 |
| 2,809,004 | A | * | 10/1957 | Kaufman et al. | 248/300 |
| 2,840,629 | A | * | 6/1958 | Roth et al. | 174/395 |
| 2,868,489 | A | * | 1/1959 | Calcut | 248/229.26 |
| 3,287,690 | A | * | 11/1966 | Book | 439/830 |
| 3,370,815 | A | * | 2/1968 | Opperthauser | 248/74.2 |
| 3,650,499 | A | * | 3/1972 | Biggane | 248/62 |
| 3,948,101 | A | * | 4/1976 | Linden | 374/194 |
| 4,119,285 | A | * | 10/1978 | Bisping et al. | 248/72 |
| 4,479,625 | A | * | 10/1984 | Martz | 248/74.1 |
| 4,958,792 | A | * | 9/1990 | Rinderer | 248/74.2 |
| 5,121,894 | A | * | 6/1992 | Twork et al. | 248/316.7 |
| 5,533,696 | A | * | 7/1996 | Laughlin et al. | 248/74.2 |
| 5,737,801 | A | * | 4/1998 | Flood | 16/30 |
| 5,806,813 | A | * | 9/1998 | Binelli | 248/73 |

(Continued)

FOREIGN PATENT DOCUMENTS

| CA | 1 057723 A1 | 7/1979 |
|---|---|---|
| EP | 1849923 A2 | 10/2007 |
| FR | 2469895 A3 | 5/1981 |

OTHER PUBLICATIONS

PCT/US2012/029102; filed Mar. 14, 2012; Raytheon Company; Search Report mailed Jun. 26, 2012.

*Primary Examiner* — Nkeisha Smith
(74) *Attorney, Agent, or Firm* — Thorpe North & Western LLP (57) ABSTRACT

Embodiments of a spring clip retention system are provided for securing a generally cylindrical component, as are embodiments of a guided munition including a spring clip retention system. In one embodiment, the spring clip retention system includes a captive feature and a spring clip. The captive feature includes opposing ledges and a channel formed beneath and partially enclosed by the opposing ledges. The spring clip includes opposing retainer arms and a base portion, which extends between the opposing retainer arms and which is received within the channel. The spring clip deflects outward when the component is inserted between the opposing retainer arms. The base portion abuts the undersides of the opposing ledges when the spring clip is deflected outward by insertion of the component to prevent disengagement of the base portion from the captive feature in a direction substantially normal to the longitudinal axis of the channel.

20 Claims, 4 Drawing Sheets

(56) References Cited

U.S. PATENT DOCUMENTS

| | | | |
|---|---|---|---|
| 5,816,539 A | 10/1998 | Chan | |
| 6,105,216 A * | 8/2000 | Opperthauser | 24/459 |
| 6,305,650 B1 * | 10/2001 | Hawkins et al. | 248/68.1 |
| 6,334,242 B1 * | 1/2002 | Scollard et al. | 24/459 |
| 6,494,415 B1 * | 12/2002 | Roth | 248/74.1 |
| 6,572,057 B1 * | 6/2003 | Roth | 248/58 |
| 6,576,880 B2 * | 6/2003 | Martorana et al. | 244/3.1 |
| 7,456,361 B2 * | 11/2008 | Hill | 174/84 C |
| 7,490,727 B2 * | 2/2009 | Spiers et al. | 211/89.01 |
| 7,784,745 B2 * | 8/2010 | Dodge | 248/73 |
| D632,554 S * | 2/2011 | Grzyb | D8/395 |
| 2004/0056158 A1 * | 3/2004 | Stuart et al. | 248/74.2 |
| 2006/0249634 A1 * | 11/2006 | Van Walraven | 248/71 |
| 2009/0321588 A1 * | 12/2009 | Sullivan | 248/74.2 |
| 2010/0155545 A1 * | 6/2010 | Birli et al. | 248/70 |
| 2011/0026237 A1 | 2/2011 | Porter | |
| 2012/0025034 A1 * | 2/2012 | Turner | 248/65 |
| 2012/0037764 A1 * | 2/2012 | Stephan et al. | 248/65 |
| 2012/0061529 A1 * | 3/2012 | Hill | 248/65 |

* cited by examiner

SPRING CLIP RETENTION SYSTEMS SUITABLE FOR USAGE WITHIN VEHICLES AND GUIDED MUNITIONS

TECHNICAL FIELD

The following disclosure relates generally to mounting systems and, more particularly, to spring clip retention systems that enable various objects to be removably secured within guided munitions, motor vehicles, and other platforms without the usage of adhesives or threaded fasteners.

BACKGROUND

Modern guided munitions commonly incorporate different types of components having generally cylindrical outer geometries, such as electromagnetic interference suppressor cores (e.g., ferrite beads) and hardline connections (e.g., cryogenic gas lines). During assembly of the guided munition, the cylindrical components are mounted within the munition's casing or shell adjacent other fabricated components. The mounting means utilized to retain a given cylindrical component in a desired position within the guided munition preferable does so in a highly secure manner to ensure that the component does not become dislodged or displaced when subjected to considerable loading conditions that occur during munition operation; e.g., high shock loads that occurring during munition launch and considerable centrifugal forces that may occur during munition flight of non-roll stabilized munition. Adhesives have traditionally been utilized to bond cylindrical components to the interior of the munition's shell, to a munition's bulkhead, or to another internal structure provided within the munition's shell. However, the usage of adhesives often requires surface cleaning and curing processes that add undesired complexity and delay to the overall munition assembly process. In addition, high strength, high temperature, industrial-grade adhesives may outgass and release caustic chemicals into the munition's interior over time, which can potentially interfere with proper operation of the munition.

To overcome the above-described limitations associated with adhesive mounting, mounting hardware can be utilized to secure cylindrical components in a desired position. Spring clips, for example, provide a relatively simple, low cost, and easy to use means of retaining a cylindrical component in a desired position. Advantageously, a spring clip can secure a cylindrical component without the usage of adhesives or additional hardware by exerting a circumferential clamping force on the exterior of the cylindrical component. However, the spring clip itself must typically be mounted to an internal structure within the guided munition. The spring clips can be adhesively bonded to internal structure of the guided munition; however, this presents essentially the same drawbacks as does bonding the cylindrical component directly to the internal structure. Fasteners are commonly utilized to mechanically secure spring clips in place; however, the usage of fasteners adds undesired cost, complexity, and part count to the guided munition. Furthermore, in the case of threaded fasteners, the formation of mating threads within the munition's internal structure adds further complexity to the fabrication process and, in certain cases, may be prohibited by spatial restrictions. As a still further disadvantage, the mechanical fastening of spring clips to a munition's internal structure is generally not amenable to automation and consequently increases human touch requirements during the assembly process.

It would thus be desirable to provide embodiments of a spring clip retention system suitable for reliably securing a generally cylindrical component within a desired position (e.g., adjacent another fabricated component) within a guided munition without the usage of fasteners or adhesives. It would further be desirable if such a spring clip retention system could also be utilized to mount generally cylindrical components within other platforms including, for example, motor vehicles. Ideally, embodiments of such a spring clip retention system would be relatively compact, lightweight, and inexpensive to produce, and would readily permit removal and repositioning of the generally cylindrical component on an as-needed basis. It would also be desirable to provide embodiments of a guided munition including such a spring clip retention system. Other desirable features and characteristics of the present invention will become apparent from the subsequent Detailed Description and the appended Claims, taken in conjunction with the accompanying Drawings and this Background.

BRIEF SUMMARY

Embodiment of a spring clip retention system are provided for securing a generally cylindrical component in a desired position. In one embodiment, the spring clip retention system includes a captive feature and a spring clip. The captive feature includes opposing ledges and a channel, which is formed beneath and which is partially enclosed by the opposing ledges. The spring clip includes opposing retainer arms, which is configured to receive and resiliently retain the generally cylindrical component therebetween, and a base portion, which extends between the opposing retainer arms and received within the channel. The spring clip deflects outward and increases in width when the generally cylindrical component is inserted between the opposing retainer arm. The base portion the base portion abutting the undersides of the opposing ledges when the spring clip is deflected outward by insertion of the generally cylindrical component to prevent disengagement of the base portion from the captive feature in a direction substantially normal to the longitudinal axis of the channel.

Embodiments of a guided munition are further provided. In one embodiment, the guided munition includes a munition mounting structure, a generally cylindrical component, and a spring clip retention system. The spring clip retention system includes, in turn, a captive feature and a spring clip. The captive feature is fixed coupled to the munition mounting structure and includes an outer surface, an inner channel, and a longitudinal opening extending from the outer surface to the inner channel. The width of the inner channel exceeds the width of the longitudinal opening. The spring clip includes opposing retainer arms, which resiliently retaining the generally cylindrical component therebetween; and a base portion, which extends from the opposing retainer arms, through the longitudinal opening, and into the inner channel in a first direction. The spring clip deflects outward when the generally cylindrical component is inserted between the opposing retainer arms. The maximum width of the base portion exceeds the width of the longitudinal opening when the spring clip is deflected outward by insertion of the generally cylindrical component to prevent disengagement of the base portion from the captive feature in a second direction substantially opposite the first direction to secure the generally cylindrical component to the munition mounting structure.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
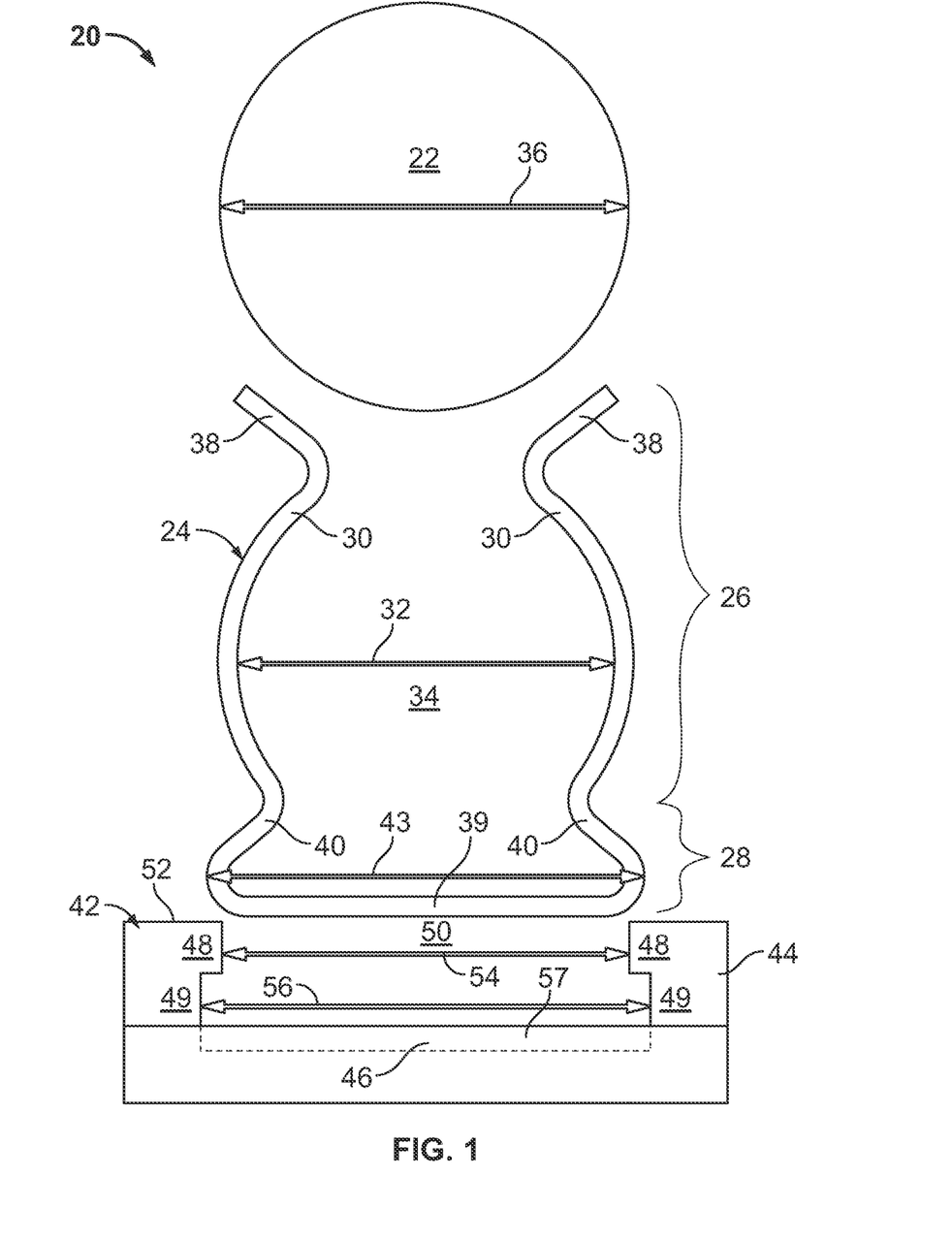
FIG. 1 is an exploded end view of a spring clip retention system and a generally cylindrical component illustrated in accordance with an exemplary embodiment of the present invention.
Figure 2:
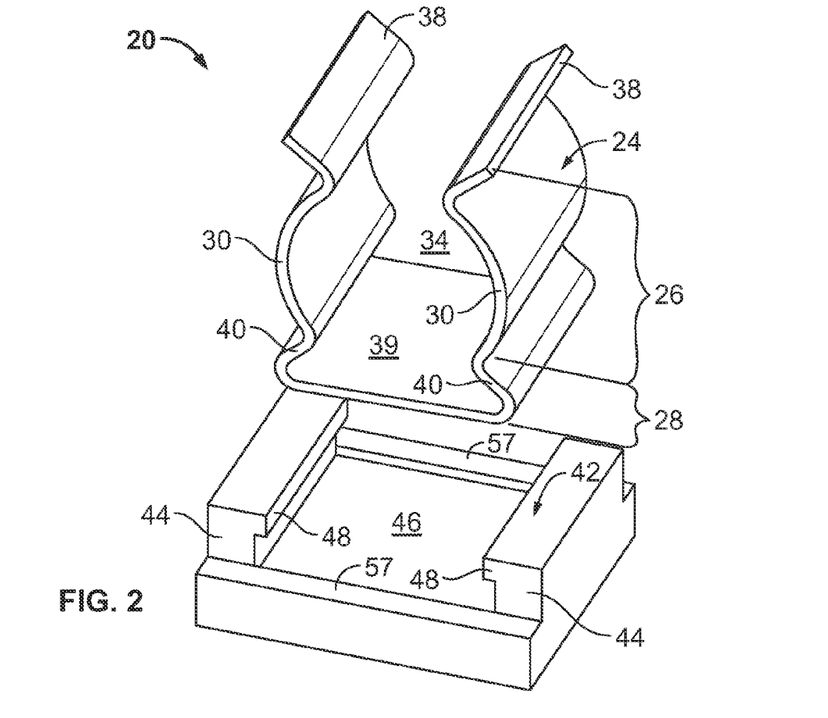
FIGS. 2 and 3 are isometric views of a spring clip retention system prior to and after insertion of a spring clip into a mating mounting structure, respectively, and illustrated in accordance with an exemplary embodiment of the present invention.

FIGS. 1 and 2 are exploded end and isomeric views, respectively, of a spring clip retention system 20 and a generally cylindrical component 22 (shown in FIG. 1 only) illustrated in accordance with an exemplary embodiment of the present invention. Notably, spring clip retention system 20 is capable of retaining cylindrical component 22 (FIG. 1) in a desired position, such as against or adjacent another fabricated component, in a highly secure manner and without the usage of adhesives or threaded fasteners. Spring clip retention system 20 is also relatively lightweight, compact, and inexpensive to produce. For at least these reasons, spring clip retention system 20 is well-suited for usage in conjunction with munitions; e.g., spring clip retention system 20 may be integrated into the seeker of a guided munition, as described more fully below in conjunction with FIGS. 8 and 9. In addition, spring clip retention system 20 is well-suited for usage within motor vehicles. These examples notwithstanding, it is emphasized that spring clip retention system 20 can be utilized across a wide variety of commercial and non-commercial industries to retain various different types of cylindrical objects without the usage of adhesives or threaded fasteners.

As appearing herein, the phrase "generally cylindrical component" is utilized to denote an object having a substantially elliptical outer geometry, as taken along at least a segment of the object's longitudinal axis or centerline. In many cases, the generally cylindrical component will have a substantially circular outer geometry, as taken along the component's entire length; however, this may not always be the case. The generally cylindrical component preferably has a substantially rigid or hard outer surface to enable the component to be firmly secured by a spring clip included within spring clip retention system 20 via a press-fit or snap-fit insertion, as described more fully below. In view of the versatility of spring clip retention system 20, the generally cylindrical component can assume a wide variety of different forms depending upon the particular application in which retention system 20 is employed. A non-exhaustive list of generally cylindrical components that may be retained by spring clip retention system 20 includes connector bodies, suppressor cores, harness connectors, tubes, wire bundles, and various types of hardlines including, but not limited to, gas lines, fuel lines, pneumatic lines, and hydraulic lines.

With continued reference to the illustrated example shown in FIGS. 1 and 2, spring clip retention system 20 includes a spring clip 24 having a retainer portion 26 and a base portion 28. Retainer portion 26 includes two opposing retainer arms 30, which are spaced apart in a lateral direction (represented in FIG. 1 by double headed arrow 32) and which open in a direction substantially opposite base portion 28. Opposing retainer arms 30 each have a substantially arcuate or concave geometry suitable for receiving and retaining generally cylindrical component 22 therebetween. Opposing retainer arms 30 define a generally annular central corridor or opening 34 into which cylindrical component 22 may be inserted, as described more fully below. Spring clip 24 is chosen or designed such that the maximum width of cylindrical component 22 (represented in FIG. 1 by double headed arrow 36) is greater than the maximum width of central opening 34 (represented in FIG. 1 by double headed arrow 32) when spring clip 24 is in a non-deflected state (shown in FIG. 1). As a result, retainer arms 30 spread apart or deflect outward to accommodate generally cylindrical component 22 when component 22 is inserted into central opening 34 of retainer portion 26. If desired, retainer arms 30 may be fabricated to terminate in flanges 38, which angle outward from the centerline of spring clip 24 to facilitate the insertion of generally cylindrical component 22 and the corresponding deflection of retainer arms 30.

Base portion 28 extends from retainer portion 26 in a first radial direction (downward in the illustrated orientation) and in a lateral direction to join opposing retainer arms 30. As shown in FIGS. 1 and 2, base portion 28 includes a bottom connecting wall 39 and opposing sidewalls 40, which are joined to opposing sides of bottom connecting wall 39. Opposing sidewalls 40 extend laterally inward from opposing ends of connecting wall 39 to connect with retainer arms 30 of retainer portion 26. Bottom connecting wall 39 has a substantially flat or plate-like geometry. By comparison, sidewall 40 each have a substantially arcuate geometry and curve inward such that sidewalls 40 laterally converge when moving from bottom connecting wall 39 toward opposing retainer arms 30. As a result of this structural configuration, spring clip 24 has a substantially hourglass-shaped profile when transitioning from retainer portion 26 to base portion 28. Stated differently, convergent sidewalls 40 of base portion 28 cooperate or combine with opposing retainer arms 30 to impart spring clip 24 with an inwardly-tapered waist section, when viewed from an end of spring clip 24. Spring clip 24 is preferably fabricated as a single, unitary, or monolithic piece such that base portion 28 is integrally formed with retainer potion 26. Spring clip 24 can be fabricated utilizing any suitable technique including, for example, stamping or cold drawing. In certain embodiments, spring clip 24 may be a commercial off-the-shelf component.

Spring clip 24 is fabricated from a resilient material. Although spring clip 24 may be fabricated from other resilient materials, including certain plastics, spring clip 24 is preferably fabricated from a metal or alloy, such as aluminum, steel, or brass. Due to the inherent resiliency of spring clip 24, retainer arms 30 exert a circumferential clamping force on generally cylindrical component 22 when inserted between arms 30 to decrease the likelihood of component 22 from becoming dislodged in the event of, for example, the application of shock forces or other disruptive forces to spring clip retention system 20. The outwardly curved geometry of retainer arms 30 further helps to maintain cylindrical component 22 in a generally centered position after insertion into retainer portion 26. Retainer arms 30, and more generally spring clip 24, secure generally cylindrical component 22 in a desired position utilizing a relatively simple and reliable press-fit or snap-fit type mechanism. The magnitude of the circumferential clamping force exerted on generally cylindrical component 22 by spring clip 24 can be adjusted, as appropriate, by varying the thickness of spring clip 24, the material from which spring clip 24 is fabricated, and the dimensions of spring clip 24 (in particular, the diameter of central opening 34) relative to the outer diameter of component 22.

In addition to spring clip 24, spring clip retention system 20 includes a channeled or slotted captive feature 42. Captive feature 42 includes a main body 44 having an inner channel 46 formed therein (partially shown in phantom in FIG. 1 and laterally bound by opposing sidewalls 49 identified in FIG. 1). In the illustrated example, main body 44 and inner channel 46 have substantially U-shaped and rectangular cross-sectional geometries, respectively. Two opposing and laterally-converging rails or ledges 48 extend inwardly from opposing sidewalls 49 to partially enclose inner channel 46. As identified in FIG. 1, opposing ledges 48 laterally bound, and thus partially define, a longitudinal slot or opening 50 in the outer face of body 44, which extends from an outer surface 52 of body 44 to inner channel 46. In view of this structural configuration, channel 46 is partially open or exposed, as taken along its length, through outer surface 52 of captive feature 42. Taken in a lateral direction, the width of longitudinal opening 50 (represented in FIG. 1 by double headed arrow 54) is less than the width of inner channel 46 (represented in FIG. 1 by double headed arrow 56). In addition, the width of longitudinal opening 50 (again, represented in FIG. 1 by double headed arrow 54) is less the maximum width of base portion 28 of spring clip 24 in a non-deflected state (again, represented in FIG. 1 by double headed arrow 43). Lastly, the width of inner channel 46 (again, represented in FIG. 1 by double headed arrow 56) is preferably, although not necessarily, slightly greater than the width of the maximum width of base portion 28 of spring clip 24 in a non-deflected state (again, represented in FIG. 1 by double headed arrow 43).

Although the possibility that captive feature 42 may be fabricated as an independent piece is by no means precluded, it is preferred that captive feature 42 is machined into, cast into, or otherwise integrally formed with a larger mounting structure included within the particular platform or system within which spring clip retention system 20 is utilized (not shown in FIGS. 1 and 2). For example, in embodiments wherein spring clip retention system 20 is deployed onboard a guided munition, captive feature 42 may be integrated into an airframe element or bulkhead, such as a seeker bulkhead of the type described below in conjunction with FIGS. 8 and 9. In embodiments wherein spring clip retention system 20 is utilized in conjunction with a motor vehicle, captive feature 42 may be integrated into a structural element included within the vehicular framework.

Figure 3:
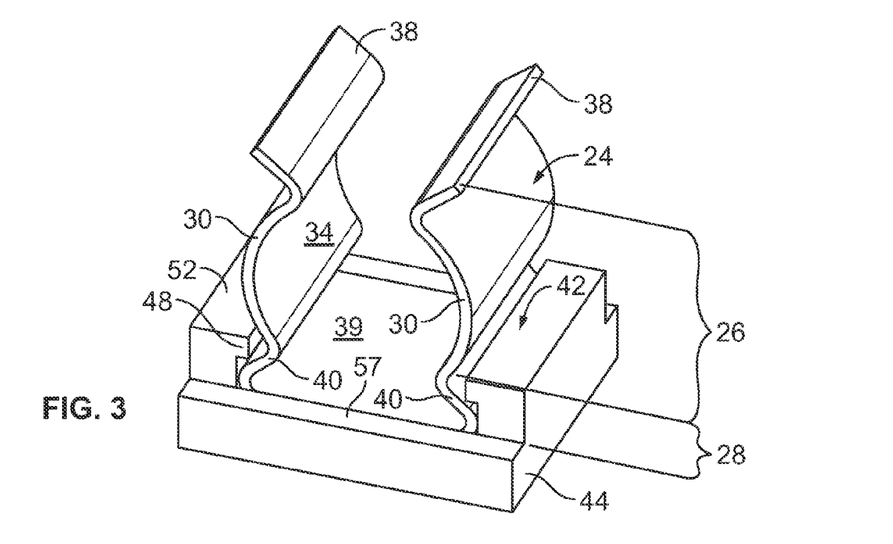

FIG. 3 is an isometric view of spring clip retention system 20 in an assembled state. Generally cylindrical component 22 is not shown in FIG. 3 to more clearly illustrate the manner in which base portion 28 of spring clip 24 engages inner channel 46 of captive feature 42. As can be seen in FIG. 3, base portion 28 is matingly received within inner channel 46 when spring clip retention system 20 is assembled. In the illustrated assembled stated, bottom connecting wall 39 is placed flat against or seats flush on the floor of channel 46. Base portion 28 extends from opposing retainer arms 30, through opening 50 (identified in FIG. 1), and into inner channel 46. Conversely, opposing retainer arms 30 extend from opposing sides of base portion 28 in a direction substantially opposite captive feature 42. As further shown in FIG. 3, when spring clip retention system 20 is assembled, the outer edges of base portion 28 may also abut axial hardstop features 57 (e.g., longitudinally-spaced end walls) to prevent axial sliding of spring clip 24 within inner channel 46, as described more fully below.

Figure 4:
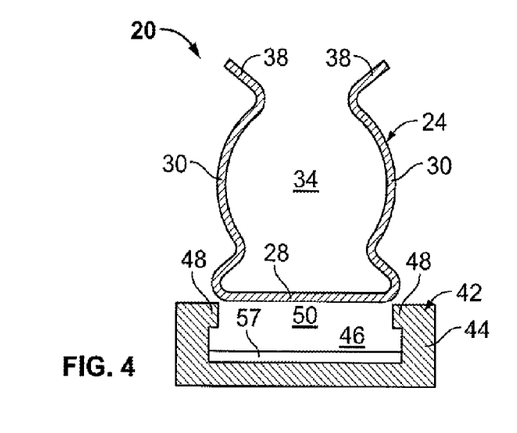
FIGS. 4-7 are cross-sectional views taken through the exemplary spring clip retention system shown in FIGS. 1-3 and illustrating the spring clip retention system at various stages of assembly.
Figure 5:
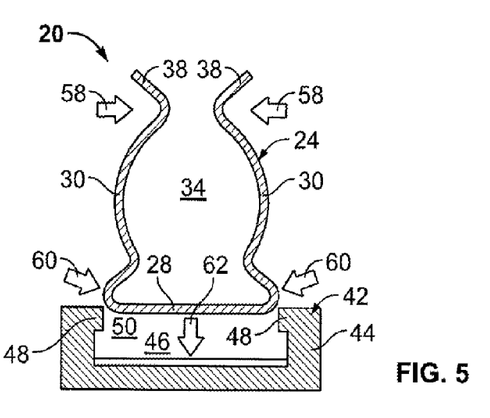
Figure 6:
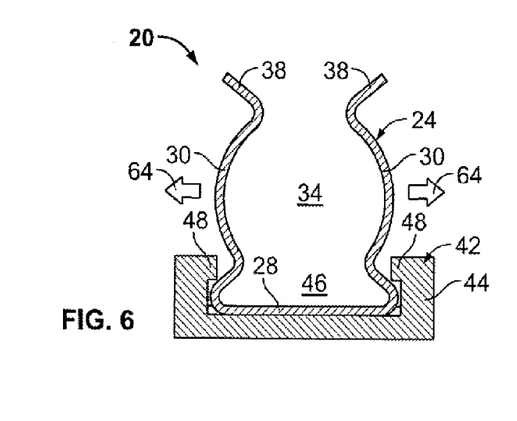

FIGS. 4-7 are cross-sectional views taken through the exemplary spring clip retention system 20 shown in FIGS. 1-3 and illustrating system 20 at various stages of assembly. Referring initially to FIG. 4, spring clip 24 is illustrated in a non-deflected state positioned immediately above longitudinal opening 50 provided in captive feature 42. Spring clip 24 is now inserted into inner channel 46 of captive feature 42 through opening 50. With reference to FIG. 5, opposing retainer arms 30 are squeezed inward (indicated in FIG. 5 by arrows 58) to cause the inward deflection of the lower corners of base portion 28 (indicated in FIG. 5 by arrows 60). In this manner, base portion 28 is laterally compressed such that the maximum width of base portion 28 is decreased to be slightly less than the width of longitudinal opening 50 thereby permitting the passage of base portion 28 through opening 50 (indicated in FIG. 5 by arrow 62). Opposing retainer arms 30 are then released to allow spring clip 24 to expand and return to its non-deflected state (indicated in FIG. 6 by arrows 64). In preferred embodiments wherein the maximum width of base portion 28 exceeds the width of opening 50 when spring clip 24 is in a non-deflected state, the maximum width of base portion 28 again surpasses the width of opening 50 to prevent the inadvertent disengagement of base portion 28 from inner channel 46. At this juncture, sufficient clearance may still be provided between spring clip 24 and the interior surfaces of captive feature 42 to permit limited movement (more informally, "rattling") of base portion 28 within inner channel 46.

Figure 7:
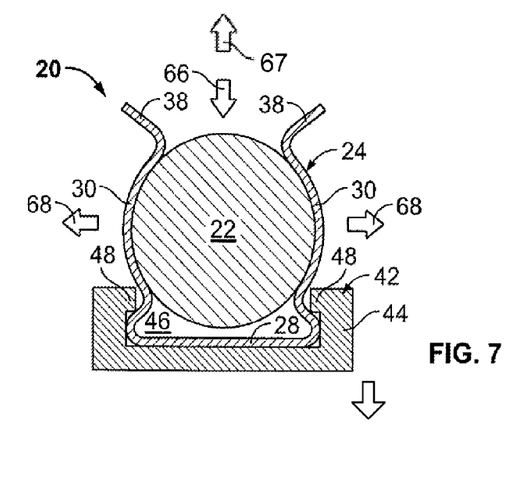

Continuing to FIG. 7, generally cylindrical component 22 is next inserted between retainer arms 30 through the upper opening in retainer portion 26 (indicated in FIG. 7 by arrow 66). As noted above, the outer diameter of generally cylindrical component 22 is greater than the maximum inner width of retainer arms 30. Thus, as indicated in FIG. 7 by arrows 68, insertion of generally cylindrical component 22 between retainer arms 30 results in the outward spread of arms 30 and, more generally, the outward deflection of spring clip 24. This, in turn, results in an expansion in the maximum width of base portion 28. In this laterally-expanded state, base portion 28 abuts the undersides of opposing ledges 48 to prevent disengagement of base portion 28 from inner channel 46 of captive feature 42 in a second direction 67 substantially normal to the longitudinal axis of inner channel 46; i.e., a direction substantially opposite to arrow 66 shown in FIG. 7. Stated differently, opposing ledges 48 extend inwardly into the laterally-tapered waist section of spring clip 24 to prevent withdrawal of spring clip 24 from channel 46 in a radial direction. In the expanded state, base portion 28 fully occupies and contacts the various surfaces defining inner channel 46 to firmly secure spring clip 24, and therefore generally cylindrical component 22, with respect to captive feature 42. In this manner, spring clip retention system 20 takes advantage of the inherent outward deflection of spring clip 24 caused by insertion of generally cylindrical component 22 to provide a structurally secure and fixed coupling with captive feature 42. Notably, this coupling is created without the usage of adhesives or threaded fasteners. In addition, as spring clip 24 is sufficiently resilient to accommodate additional outward deflection or lateral expansion beyond that required to bring base portion 28 into contact with opposing ledges 48, spring clip 24 and captive feature 42 may be manufactured within relatively broad tolerances. As a still further advantage, by performing the above-described steps in a reverse order (in particular, by removing generally cylindrical component 22 from between opposing retainer arms 30), spring clip retention system 20 can be readily dissembled if, for example, repositioning or reinstallation of spring clip 24 should be desired.

Axial sliding of spring clip 24, and specifically base portion 28, within inner channel 46 may be deterred by frictional forces created by contact between base portion 28 and the various surfaces defining channel 46 including the undersides of convergent ledges 48. This notwithstanding, in preferred embodiments, spring clip retention system 20 is manufactured to include at least one axial location feature that engages spring clip 24 to prevent axial sliding of base portion 28 within channel 46. In certain embodiments, the axial location feature may assume the relatively simple form of end walls partially or fully enclosing channel 46, as taken in a longitudinal direction. For example, as briefly described above, captive feature 42 may be manufactured to include first and second end walls 57 (shown in FIGS. 1-4), which are spaced apart by a longitudinal distance substantially equivalent to the length of base portion 28 such that walls 57 contact or abut opposing edges of bottom connecting wall 28 when base portion 28 is inserted into channel 46 to constrain movement of spring clip 24 in either axial direction. In further embodiments, other types of axial hardstop features may be utilized in place of end walls 57, such as one or more bumps, tabs, or other protrusions. In still further embodiments, a protruding member may be inserted into captive feature 42 and extend outwardly therefrom to contact an interior portion of base portion 28. An example of a spring clip retention system wherein axial sliding of a spring clip is prevented by a protruding member is described below in conjunction with FIGS. 8 and 9.

Figure 8:
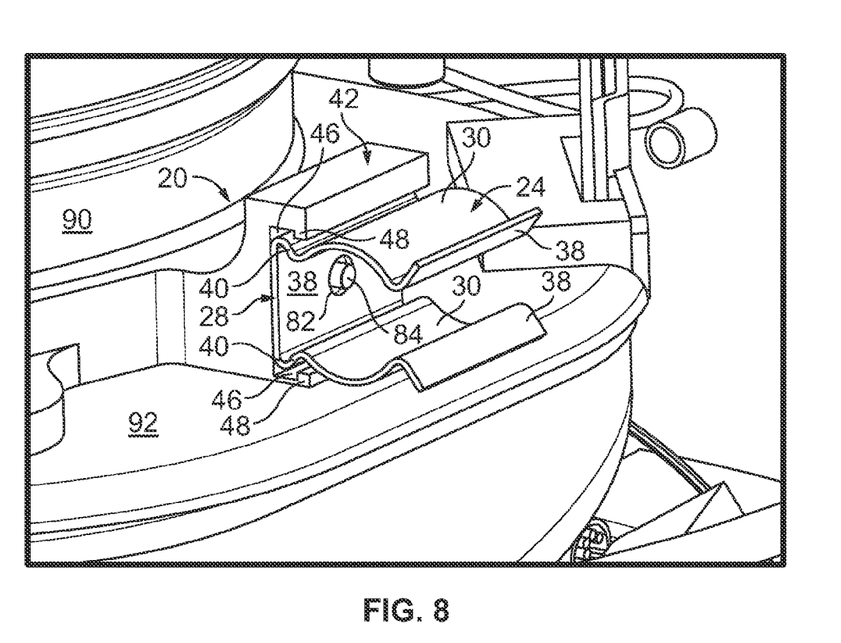
FIG. 8 is an isometric view of a spring clip retention system integrated into the seeker bulkhead of a guided munition in accordance with a further exemplary embodiment of the present invention.
Figure 9:
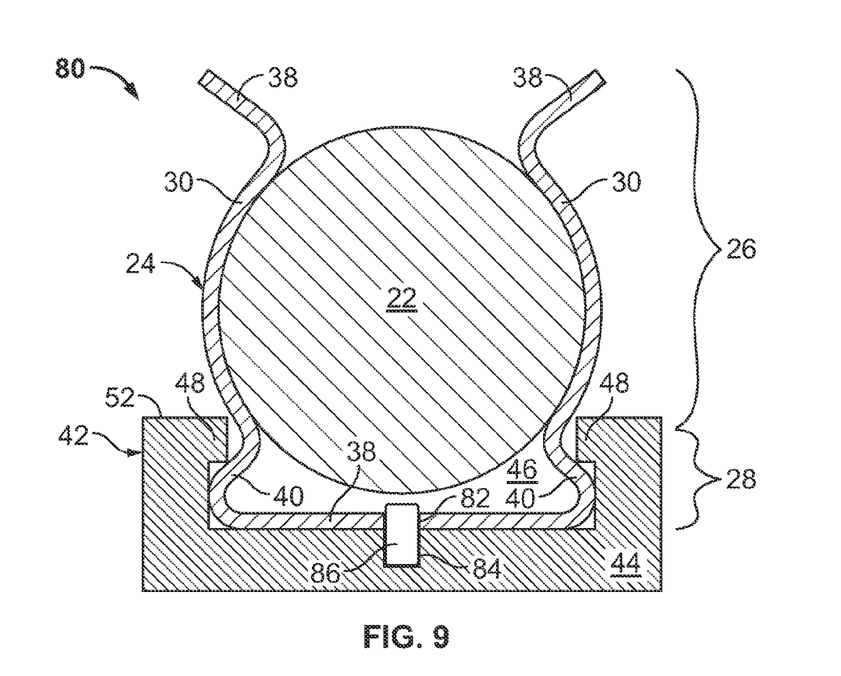
FIG. 9 is a cross-sectional view of the spring clip retention system shown in FIG. 8 and illustrating the manner in which axial sliding of a spring clip can be prevented utilizing a protruding member, such as a dowel pin.

FIGS. 8 and 9 are isometric and cross-sectional views, respectively, of a spring clip retention system 80 illustrated in accordance with a further exemplary embodiment of present invention. In many respects, spring clip retention system 80 is identical to spring clip retention system 20 described above in conjunction with FIGS. 1-7; this may be most easily appreciated by comparing FIGS. 3 and 7 to FIGS. 8 and 9, respectively, wherein like reference numerals have been utilized to denote like structural elements. However, in contrast to the previously-described embodiment, a first opening 82 has been formed through bottom connecting wall 39; and a second opening 84 has been formed in the floor of inner channel 46. Openings 80 and 82 when base portion 28 of spring clip 24 is properly positioned within channel 46. A protruding member 86, such as a dowel pin, in inserted into openings 82 and 84; and projects upward from the floor of channel 46 and through bottom wall 39 to physically obstruct movement of base portion 28 in either axial direction. Protruding member 86 may be maintained in place by frictional forces resulting from a press-fit. The length of protruding member 86 and the depth of opening 84 are preferably chosen such that protruding member 86 is prevented from disengaging or backing-out of opening 84 in a high vibratory environment by abutment with generally cylindrical component 22, as shown most clearly in FIG. 9.

In embodiments wherein a protruding member 86 assumes the form of a freely-removable feature, either or both ends of channel 46 may be left open to permit base portion 28 to be slid into channel 46 in an axial direction. More specifically, base portion 28 may first be slid axially into channel 46 through an open channel end (e.g., the open channel end shown in FIG. 8) and moved into the desired position. Protruding member 82 may then be inserted through opening 82 provided in bottom wall 39 and into the aligning opening 84 provided in the floor of channel 46 to fixate spring clip 24 in its proper axial position. Generally cylindrical component 22 may then be inserted between opposing retainer arms 30 to further secure spring clip 24 to captive feature 42 and complete the assembly process. In such embodiments, the maximum width of base portion 28 need not be less than the width of opening 50 (identified in FIGS. 1, 4, and 5) when spring clip 24 is inwardly deflected by squeezing opposing retainer arms 30 toward one another as base portion 28 is not inserted through opening 50 during assembly.

As noted above, captive feature 42 is preferably integrally formed with a larger mounting structure included within the platform, device, or vehicle within which spring clip retention system 20 is deployed. In certain preferred embodiments, spring clip retention system 20 is utilized within a guided munition, such as guided munition 90 shown in FIG. 8. In this case, captive feature 42 may be machined into or other integrally formed with a primary structural element of guided munition 90, such as an airframe structure or a seeker bulkhead 92 (generically referred to herein as a "vehicular mounting structure"). In such embodiments, generally cylindrical component 22 will often assume the form of a hardline connect (e.g., a cryogenic gas line) or a suppressor core (e.g., a ferrite bead), as generically illustrated in FIG. 9. In further preferred embodiments wherein spring clip retention system 20 is utilized within a motor vehicle, captive feature 42 may be machined into or otherwise integrally formed with the vehicular framework (also generically referred to herein as a "vehicular mounting structure"); and generally cylindrical component 22 may assume the form of, for example, a hard wire bundle or a fuel line.

The foregoing has thus provided embodiments of a spring clip retention system suitable for reliably securing a generally cylindrical component within a desired position (e.g., adjacent another fabricated component) without the usage of fasteners or adhesives thereby reducing touch labor and hardware cost. Advantageously, the above-described embodiments of the spring clip retention system are relatively compact, lightweight, and inexpensive to produce, and readily permit removal and repositioning of the generally cylindrical component as needed. The foregoing has also provided embodiments of a guided munition including such a spring clip retention system. While useful in a wide variety applications and contexts, embodiments of the spring clip retention system are especially well-suited for usage within guided munitions and motor vehicles. As appearing herein, the term "vehicle" is utilized to encompass both motor vehicles and guided munitions, which deliver a payload to a designated delivery point. The term "vehicle" also encompasses Unmanned Aerial Vehicles, exoatmospheric vehicles, spacecraft, and other airborne and space-borne platforms of type which carry at least one deployable device or structure, as well as water- and land-based robotic vehicles.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A spring clip retention system for securing a generally cylindrical component in a desired position, the spring clip retention system comprising:
   a captive feature, comprising:
      opposing ledges; and
      a channel formed beneath and partially enclosed by the opposing ledges;
   a spring clip, comprising:
      opposing retainer arms configured to receive and resiliently retain the generally cylindrical component therebetween, the spring clip deflecting outward and increasing in width when the generally cylindrical component is inserted between the opposing retainer arms; and
      a base portion extending between the opposing retainer arms and received within the channel, the base portion operable to abut undersides of the opposing ledges upon the retainer arms being deflected outward in a direction orthogonal to a longitudinal axis of the channel by insertion of the generally cylindrical component, wherein the outward deflection of the retainer arms prevents disengagement of the base portion from the captive feature in a second direction substantially normal to the longitudinal axis of the channel.

2. A spring clip retention system according to claim 1 wherein the captive feature further comprises a longitudinal opening laterally bound by the opposing ledges and extending from an outer surface of the captive feature to the channel, the width of the longitudinal opening being less than the width of the channel and less than a maximum width of the base portion when the spring clip is deflected outward by insertion of the generally cylindrical component.

3. A spring clip retention system according to claim 2 wherein the maximum with of the base portion is greater than the width of the longitudinal opening when the spring clip is in a non-deflected state.

4. A spring clip retention system according to claim 2 wherein the spring clip is movable into a compressed deflected position prior to insertion of the generally cylindrical component by squeezing together the opposing retainer arms, the maximum width of the base portion being less than the width of the longitudinal opening in the compressed deflected position to permit insertion of the base portion into the channel through the longitudinal opening during assembly of the spring clip retention system.

5. A spring clip retention system according to claim 1 wherein at least one end of the channel is open in an axial direction, and wherein the base portion of the spring clip is slidably inserted into the channel through the open end.

6. A spring clip retention system according to claim 1 wherein the spring clip has a substantially hourglass-shaped end profile when moving from the retainer arms to the base portion.

7. A spring clip retention system according to claim 1 wherein the spring clip consists of a unitary resilient piece.

8. A spring clip retention system according to claim 1 wherein the captive feature further comprises:
   a U-shaped main body into which the channel is formed, wherein the opposing ledges extend inwardly from the U-shaped main body to partially enclose the channel and define, at least in part, a longitudinal opening.

9. A spring clip retention system according to claim 8 wherein the base portion contacts inner surfaces of the opposing ledges when the base portion is received by the channel and the spring clip is deflected outward by insertion of the generally cylindrical component.

10. A spring clip retention system according to claim 1 further comprising at least one axial location feature fixedly coupled to the captive feature and contacting the spring clip to prevent axial sliding of the base portion within the inner channel.

11. A spring clip retention system according to claim 10 wherein the at least one axial location feature comprises a protruding member extending from the channel to engage the base portion of the spring clip.

12. A spring clip retention system according to claim 11 wherein the base portion has an aperture therein, and wherein the protruding member extends into the aperture.

13. A spring clip retention system according to claim 12 wherein the protruding member comprises a dowel pin.

14. A spring clip retention system according to claim 1 further comprising a vehicular frame member to which the captive feature is fixedly coupled.

15. A spring clip retention system according to claim 14 wherein the captive feature is integrally formed with the vehicular frame member.

16. A spring clip retention system according to claim 14 wherein the vehicular frame member comprises a seeker bulkhead of a guided munition.

17. A spring clip retention system for securing a generally cylindrical component within a vehicle, the spring clip retention system comprising:
   a vehicular mounting structure;
   a captive feature integrally formed with the vehicular mounting structure, captive feature comprising:
      an outer surface;
      an inner channel; and
      an longitudinal opening extending from the outer surface to the inner channel, the width of the inner channel exceeding the width of the longitudinal opening; and
   a spring clip, comprising:
      opposing retainer arms configured to receive and retain the generally cylindrical component therebetween, the retainer arms deflecting outward orthogonally to the channel when the generally cylindrical component is inserted between the opposing retainer arms; and
      a base portion extending from the opposing retainer arms, through the longitudinal opening, and into the inner channel in a first direction, wherein a maximum width of the base portion exceeds the width of the longitudinal opening upon the orthogonally outward deflection of the retainer arms with respect to the channel upon insertion of the generally cylindrical component, wherein the retainer arm deflection prevents disengagement of the base portion from the captive feature in a second direction substantially opposite the first direction.

18. A guided munition, comprising:
   a munition mounting structure;
   a generally cylindrical component; and
   a spring clip retention system, comprising:
      a captive feature fixedly coupled to the munition mounting structure, the captive feature having an outer surface, an inner channel, and a longitudinal opening extending from the outer surface to the inner channel, the width of the inner channel exceeding the width of the longitudinal opening; and
      a spring clip, comprising:

opposing retainer arms resiliently retaining the generally cylindrical component therebetween, the spring clip deflecting outward when the generally cylindrical component is inserted between the opposing retainer arms; and a base portion extending from the opposing retainer arms, through the longitudinal opening, and into the inner channel in a first direction, wherein a maximum width of the base portion is caused to exceed the width of the longitudinal opening upon the retainer arms being deflected orthogonally outward from the channel by insertion of the generally cylindrical component, which deflection prevents disengagement of the base portion from the captive feature in a second direction substantially opposite the first direction to secure the generally cylindrical component to the munition mounting structure.

19. A guided munition according to claim 18 wherein the generally cylindrical component comprises an electromagnetic interference suppressor core.

20. A guided munition according to claim 18 wherein the munition mounting structure comprises a seeker bulkhead.

* * * * *